(12) United States Patent
Pronk et al.

(10) Patent No.: US 11,921,571 B2
(45) Date of Patent: Mar. 5, 2024

(54) METHOD TO EFFICIENTLY EVALUATE A LOG PATTERN

(71) Applicant: KONINKLIJKE PHILIPS N.V., Eindhoven (NL)

(72) Inventors: Serverius Petrus Paulus Pronk, Vught (NL); Johannes Henricus Maria Korst, Eindhoven (NL); Mauro Barbieri, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 466 days.

(21) Appl. No.: 17/293,059

(22) PCT Filed: Dec. 19, 2019

(86) PCT No.: PCT/EP2019/086209
§ 371 (c)(1),
(2) Date: May 12, 2021

(87) PCT Pub. No.: WO2020/127663
PCT Pub. Date: Jun. 25, 2020

(65) Prior Publication Data
US 2021/0397499 A1 Dec. 23, 2021

Related U.S. Application Data

(60) Provisional application No. 62/782,381, filed on Dec. 20, 2018.

(51) Int. Cl.
*G06F 11/07* (2006.01)
*G06F 11/30* (2006.01)
*G06F 11/32* (2006.01)

(52) U.S. Cl.
CPC ........ *G06F 11/079* (2013.01); *G06F 11/0706* (2013.01); *G06F 11/0775* (2013.01);
(Continued)

(58) Field of Classification Search
USPC ........................................................ 702/187
See application file for complete search history.

(56) References Cited

U.S. PATENT DOCUMENTS

| 6,173,418 B1 | 1/2001 | Fujino |
| 2006/0161816 A1 | 7/2006 | Gula |

(Continued)

FOREIGN PATENT DOCUMENTS

| CN | 101610174 | 12/2009 |
| WO | 2019243145 | 12/2019 |

OTHER PUBLICATIONS

International Search Report and Written Opinion dated Mar. 23, 2020 for International Application No. PCT/EP2019/086209 Filed Dec. 19, 2019.

(Continued)

*Primary Examiner* — Paul D Lee

(57) ABSTRACT

A non-transitory computer-readable medium stores instructions readable and executable by at least one electronic processor (10, 12, 14) to perform a log pattern analysis method (300) by applying a log pattern to log data undergoing analysis comprising log events which are time stamped and which are defined by values for a set of fields. The log data undergoing analysis are stored on a server (30) accessible by the at least one electronic processor via an electronic network (31). The log pattern analysis method includes: constructing a retrieval query to select log events that are in a time interval and that also satisfy at least one additional constraint associated with the log pattern and defined on one or more filter fields of the set of fields; downloading a sub-set of the log data undergoing analysis from the server to the at least one electronic processor via the electronic network, wherein the sub-set is selected from the log data undergoing analysis by the retrieval query; applying the log pattern to the downloaded sub-set of the log (Continued)

data undergoing analysis to identify log pattern hits in the log data undergoing analysis; and controlling a display screen (16) to display a report of the log pattern hits in the log data undergoing analysis.

20 Claims, 5 Drawing Sheets

(52) U.S. Cl.
CPC ...... *G06F 11/0784* (2013.01); *G06F 11/3003* (2013.01); *G06F 11/3013* (2013.01); *G06F 11/3075* (2013.01); *G06F 11/3082* (2013.01); *G06F 11/321* (2013.01); *G06F 2201/835* (2013.01)

(56) References Cited

U.S. PATENT DOCUMENTS

| | | |
|---|---|---|
| 2011/0154117 A1 | 6/2011 | Danielson |
| 2014/0188860 A1 | 7/2014 | Zhang |
| 2016/0196174 A1 | 7/2016 | Jacob |
| 2016/0277268 A1* | 9/2016 | Brown ................ G06F 11/0778 |
| 2019/0121686 A1* | 4/2019 | Vasileva ............. G06F 11/0778 |
| 2019/0354422 A1* | 11/2019 | Xu ........................ H04L 41/069 |

OTHER PUBLICATIONS

Lin, et al: "Log Clustering based Problem Identification for Online Service Systems", 2016 IEEE/ACM 38th IEEE International Conference on Software Engineering Companion.

* cited by examiner

METHOD TO EFFICIENTLY EVALUATE A LOG PATTERN

CROSS REFERENCE TO RELATED APPLICATIONS

This application is the U.S. National Phase application under 35 U.S.C. § 371 of International Application No. PCT/EP2019/086209 filed Dec. 19, 2019, which claims the benefit of U.S. Provisional Patent Application No. 62/782,381 filed Dec. 20, 2018. These applications are hereby incorporated by reference herein.

FIELD

The following relates generally to the medical imaging device servicing arts, fault diagnosis arts, log pattern detection arts, and related arts.

BACKGROUND

Medical imaging systems such as magnetic resonance imaging (MRI), transmission computed tomography (CT), and intraoperative X-ray (iXR) scanners occasionally experience a system failure that can in some cases be resolved by a remote service engineer (RSE). Quite often, however, a field service engineer (FSE) has to visit the hospital to resolve the issue. Especially when a part has to be replaced, it is unavoidable that an FSE visits the hospital. Depending on whether the root cause of a system failure can be determined remotely, resolving the issue may require multiple FSE visits when the required part is not available during the first visit. In the first visit, the FSE determines the root cause of the problem and determines whether one or more parts have to be replaced to resolve the issue, and if so, which part(s). After ordering the part(s), the FSE will do the actual replacement in a second visit. Incidentally, the identification of the root cause is difficult and more than two visits may be needed to resolve the issue if the root cause cannot be unambiguously determined in the first visit.

To reduce the unplanned downtime of medical imaging systems due to these failures and to reduce the associated maintenance costs, it would be advantageous to increase the fraction of issues that can be resolved remotely; and, for those issues where an FSE needs to visit the hospital, to decrease the number of visits that are needed to resolve the issue. The number of visits can be decreased by diagnosing the issue remotely.

To remotely determine the most probable root cause of a failure, machine log data can be used. When in operation, many commercial medical imaging systems continuously produce logging data. These are timestamped messages containing status information, information about events, as well as warning and error content. Typically, this logging data is stored locally, so that an FSE can inspect the data when on site. Additionally, a service engineer with appropriate access authorization may be able to remotely inspect the logging data. Furthermore, in some installations, logging data is uploaded (e.g. on a daily basis) to a central storage server, where it can be analyzed to identify the most common issues for the complete installed base of imaging systems.

To aid in the root cause analysis of system failures, one approach is to create log patterns that correlate with known failure modes. Based on experience and reviews of log event data, a log pattern can be handcrafted by making logical combinations of the occurrence or non-occurrence of certain log events within a given time span, together with a cause-solution tree, which lists a number of possible causes of the failure, together with one or more solutions per cause. Upon a service call from a hospital due to a system failure, the log patterns are applied to the log events generated over some time interval prior to the call, e.g., during one day or one week prior to the call. If a log pattern occurs one or more times, an alert is generated so that an engineer can use it in the root cause analysis. This pre-call trace of log events are uploaded and analyzed to generate a log-file on demand (LoD) in which log events are hosted on a remote server and only log events of a certain time interval, such as those generated from the start of the day until the moment of uploading, are downloaded and considered. If a log pattern occurs one or more times in the downloaded log data, an alert is generated so that an engineer can use the cause-solution tree in the root cause analysis.

A log pattern has a hit in a sequence of log events that have been generated by one machine in a given interval of time if there is a time interval, the length of which is equal to the time span of the log pattern, in which the Boolean expression of the log pattern evaluates to true. Once a hit has been found, the time interval identified is shrunk maximally to just 'contain' the hit, which is then counted as one hit, and searching for additional hits is continued by repositioning the window directly after the shrunken interval. A log pattern may also be said to have a hit for a service call, by which it is meant that the log pattern has at least one hit in a predefined interval of time prior to this service call.

Analysis of the performance of a log pattern can be quantified in various ways, such as: How often does it occur and, when it occurs, does it occur at the right occasion, i.e., does it relate to the failure at hand, does the cause-solution tree provide useful guidance, et cetera. Log patterns that generate too many alerts can have a detrimental effect on the effectiveness of the root cause analysis; while log patterns that produce too few alerts are of limited diagnostic value. This performance analysis is typically done on historical data.

If, during the design of a log pattern, a fast and reliable assessment of its performance can be supplied, the pattern can be significantly tailored and improved. Having a sizeable set of high-quality log patterns has a significant positive effect on the maintenance of the systems, in particular in terms of total cost of ownership and less unplanned downtime.

As the performance analysis involves complex correlations, it is already appreciated by diagnostic designers if an analysis would be done providing all calls for which a log pattern hits, daily hit counts of the log pattern, together with additional information on replaced parts, service-work order data, et cetera. Using this data, diagnostic designers are capable to further assess the performance of a log pattern, based on their expertise and experience.

The following discloses certain improvements.

SUMMARY

In some embodiments disclosed herein, a non-transitory computer-readable medium stores instructions readable and executable by at least one electronic processor to perform a log pattern analysis method by applying a log pattern to log data undergoing analysis comprising log events which are time stamped and which are defined by values for a set of fields. The log data undergoing analysis are stored on a server accessible by the at least one electronic processor via an electronic network. The log pattern analysis method includes: constructing a retrieval query to select log events that are in a time interval and that also satisfy at least one additional constraint associated with the log pattern and defined on one or more filter fields of the set of fields; downloading a sub-set of the log data undergoing analysis from the server to the at least one electronic processor via the electronic network, wherein the sub-set is selected from the log data undergoing analysis by the retrieval query; applying the log pattern to the downloaded sub-set of the log data undergoing analysis to identify log pattern hits in the log data undergoing analysis; and controlling a display screen to display a report of the log pattern hits in the log data undergoing analysis.

In some embodiments disclosed herein, a log pattern analysis device includes an electronic processor. A non-transitory computer-readable medium stores instructions readable and executable by the electronic processor to: (i) perform a retrieval constraint generation method operating on historical log data comprising log events which are time stamped and which are defined by values for the set of fields, in which the retrieval constraint generation method includes: normalizing selected fields of the set of fields in the log pattern to generate at least one normalized log pattern item wherein the selected fields do not include the one or more filter fields; identifying matching normalized log events that match the at least one normalized log pattern item in normalized log data wherein the normalized log data are generated from the historical log data by normalizing the selected fields in the historical log data; and generating at least one additional constraint from values of the one or more filter fields in the matching normalized log events; and (ii) perform a log pattern analysis method by applying a log pattern to log data undergoing analysis comprising log events which are time stamped and which are defined by values for a set of fields, wherein the log data undergoing analysis are stored on a server accessible by the at least one electronic processor via an electronic network, in which the log pattern analysis method includes: constructing a retrieval query to select log events that are in a time interval and that also satisfy the at least one additional constraint associated with the log pattern and defined on one or more filter fields of the set of fields; downloading a sub-set of the log data undergoing analysis from the server to the at least one electronic processor via the electronic network, wherein the sub-set is selected from the log data undergoing analysis by the retrieval query; applying the log pattern to the downloaded sub-set of the log data undergoing analysis to identify log pattern hits in the log data undergoing analysis; and controlling a display screen to display a report of the log pattern hits in the log data undergoing analysis.

In some embodiments disclosed herein, a log pattern analysis method includes: retrieving historical log data comprising log events which are time stamped and which are defined by values for the set of fields; normalizing selected fields of the set of fields in the log pattern to generate at least one normalized log pattern item wherein the selected fields do not include the one or more filter fields; identifying matching normalized log events that match the at least one normalized log pattern item in normalized log data wherein the normalized log data are generated from the historical log data by normalizing the selected fields in the historical log data; generating at least one additional constraint from values of the one or more filter fields in the matching normalized log events; applying a log pattern to log data undergoing analysis comprising log events which are time stamped and which are defined by values for a set of fields, constructing a retrieval query to select log events that are in a time interval and that also satisfy the at least one additional constraint associated with the log pattern and defined on one or more filter fields of the set of fields; downloading a sub-set of the log data undergoing analysis from the server to the at least one electronic processor via the electronic network, wherein the sub-set is selected from the log data undergoing analysis by the retrieval query; applying the log pattern to the downloaded sub-set of the log data undergoing analysis to identify log pattern hits in the log data undergoing analysis; and controlling a display screen to display a report of the log pattern hits in the log data undergoing analysis.

One advantage resides in providing a medical imaging device log pattern editor with automated performance analysis having high computational efficiency.

Another advantage resides in providing a medical imaging device log pattern editor with automated performance analysis having faster computational speed.

Another advantage resides in providing a medical imaging device log pattern editor that imposes reduced log data transfer traffic on an associated electronic data network.

Another advantage resides in providing a medical imaging device diagnostic system with improved diagnostic accuracy achieved by deployed log patterns having undergone more efficient performance analysis using a log pattern analyzer as disclosed herein.

Another advantage resides in retrieving log events only within a predetermined time period, and further only that portion of the log data in the predetermined time period which satisfies specified additional constraints, thereby reducing time, transmission capacity, local storage capacity, and computing capacity.

Another advantage resides in matching historical data with log data undergoing an analysis to test or validate a log pattern.

Another advantage resides in generating, and optionally storing, additional constraints determined from log data matching with the log pattern.

Another advantage resides in using such additional constraints as a filter to reduce the amount of historical data that is downloaded and/or compared with a log pattern being tested or validated.

Another advantage resides in using such additional constraints as a filter to reduce the amount of medical imaging machine log data that is downloaded and/or compared with a log pattern in order to diagnose a problem with the medical imaging machine.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

Figure 1:
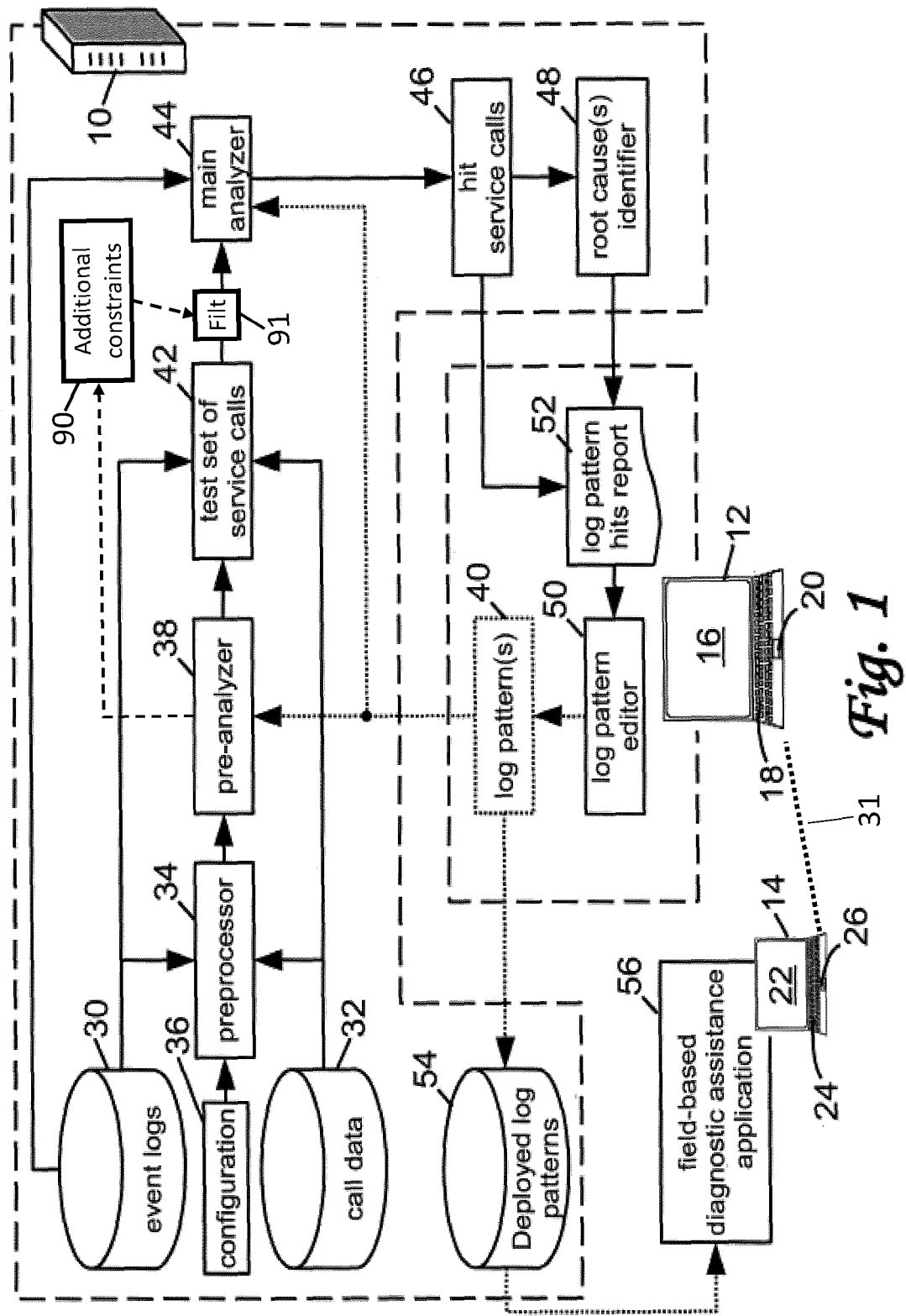
FIG. 1 diagrammatically illustrates a medical imaging system diagnostic system including a log pattern editing device with efficient automated performance analysis as disclosed herein, and a computerized diagnostic assistance device employing log patterns generated using the log pattern editing device.

The assessment of the performance of a log pattern using historical data entails applying the log pattern to log event data generated over many prior calls. Consider, for example, an installed base of thousands of medical imaging systems, which collectively experience 10,000 service calls per year. Suppose a log pattern hits for a 100 service calls per year, i.e., for 1% of all service calls. Making an assessment of the performance of the log pattern would require a significant number of service calls to be analyzed. Even analyzing log events for 1,000 random service calls (10% of all service calls) would only yield 10 service calls on average for which the log pattern would hit. This is generally not sufficient to do a proper statistical analysis, making this approach difficult or even infeasible in practice. On the other hand, processing all log events for all 10,000 service calls would yield 100 service calls for which the log pattern would hit. This would likely be sufficient for statistical analysis—however, the computing resources required to process this huge quantity of log events data would be very substantial, again making this approach difficult or even infeasible in practice.

In approaches disclosed herein, these difficulties are reduced by way of performing disclosed preprocessing of the historical log events data. This can be done once for a given time frame in the past (and optionally with certain other specified constraints) to generate a set of normalized log events that then undergo a disclosed pre-analysis to identify a superset of the service calls for which a given pattern hits. The preprocessing is not specific for a given log pattern (although in some embodiments known constraints on the type of log pattern to be analyzed may enable more effective normalization; this may be balanced against the goal of reusability of the normalized log data in selecting the extent of normalization). Due to the lack of log pattern specificity of the preprocessing, if a diagnostic designer is in the process of defining a new log pattern, then the log pattern may be adjusted and rerun against the same normalized log data generated once by the preprocessing, so that the preprocessing step need not be repeated. This facilitates rapid analysis of variations of the log pattern of the type likely to be generated by a diagnostic designer adjusting the log pattern in an effort to optimize it for a specific diagnostic task. The pre-analysis does depend on the log pattern, but operates on a reduced data set, i.e. the normalized data generated by the preprocessing, and hence is more efficient than analyzing all available log data. The pre-analysis can be seen as a filtering step that, for each log pattern, filters the set of all calls in a given time frame to a relatively small superset of calls for which the log pattern may hit.

The superset is chosen by the pre-analysis so as to ensure that no (or at least very few) hits with the log pattern under analysis are discarded. This is done by identifying the test set of normalized log events that match the log pattern under analysis. This matching is similar to conventional matching of (unnormalized) log events to the log pattern, except that matching of normalized content of the log events is handled differently. Conceptually, the log pattern may be viewed as being normalized, insofar as log pattern items that correspond to normalized fields of the log events are handled in accord with predefined normalized content matching rules for the defined normalization (these are said to be normalized log pattern items). In this context, a normalized log event is said to match the normalized log pattern under analysis if the normalized log event matches an individual, normalized log pattern item of the normalized log pattern. This may lead to some hits being in error (as compared with whether the unnormalized log event would hit the unnormalized log pattern); but, in no case (or at least in very few, unusual cases) will log events that actually hit the log pattern under analysis be erroneously discarded by the matching of the normalized log events with the normalized log pattern. Thus, the resulting test set is a superset in the sense that it includes all calls (or at least almost all calls) for which the log pattern under analysis has a hit, and also may (indeed usually will) include additional calls for which the log pattern under analysis does not have a hit.

In a further improvement disclosed herein, the unnormalized fields (or columns) of the normalized log data that match a normalized log pattern can be used as additional constraints to further reduce the amount of data that is downloaded for analysis using the (unnormalized) log pattern. In some embodiments disclosed herein, the event ID (which actually identifies "type" of log event, rather than being a unique event identifier) and the event category (a broader "typing"; as there are only a handful of event categories) are two fields that are sometimes used as inputs to the log pattern (and hence are not normalized) which are also useful as additional constraints in limiting the download. However, these are merely illustrative examples, and more generally at least one additional constraint is defined on one or more filter fields of the set of fields forming the log entry during the pre-processing operations.

For each test call identified by the pre-analysis, only the log events that match the additional constraints extracted from the matching normalized log data are retrieved and analyzed by the (unnormalized) log pattern undergoing testing or validation. The additional constraints could also be used in the diagnosis phase in order to limit download of log data for a specific medical imaging device undergoing diagnosis by a RSE or by a FSE. In some examples, the additional constraints are formed by making a logical combination with "AND" and "OR" operations of the individual field values. It may be a complex logical expression, which is used as an additional "AND" clause in a database query or a file download request. In a diagnostic context, to provide the most up-to-date additional constraints at the time of a service call, the additional constraints can be generated "on the fly" by performing the pre-analysis on the most up-to-date historical normalized log events dataset. As this normalized dataset is relatively small (e.g., 1 GB), it may be updated occasionally (say, monthly) and pre-loaded onto the service engineer's computer as a monthly update. The validated log pattern that is about to be applied in an effort to diagnose the problem with the medical imaging device is then normalized and the pre-analysis is performed by applying the normalized validated log pattern against the most up-to-date historical normalized log events database to identify the matching normalized log events. Then, the (event ID, event category) field value pairs of these matching normalized log events define the up-to-date additional constraints for the validated log pattern. Only those log events of the machine under diagnosis in the time interval of the call (say, for the last X hours up to placement of the service call) which match these up-to-date additional constraints are retrieved and analyzed using the (original, i.e. unnormalized) validated log pattern. This greatly reduces the number of events that are retrieved and to which the validated log pattern is applied.

In other embodiments, the additional constraints that were generated during the validation phase of the validated log pattern may be stored together with the final validated log pattern. When the service engineer proceeds to apply the validated log pattern the stored additional constraints are retrieved and incorporated into the log events retrieval query. This avoids the additional processing required to produce the up-to-date additional constraints "on the fly", albeit at the possible cost of having potentially dated additional constraints.

With reference to FIG. 1, a medical imaging system diagnostic system is diagrammatically illustrated, which includes a log pattern editing device 10, 12 with efficient automated performance analysis as disclosed herein, and a computerized diagnostic assistance device 14 employing log patterns generated using the log pattern editing device. The log pattern editing device comprises a server computer 10 operatively connected with a non-transitory storage medium (not shown) to read and execute the instructions to perform a log pattern analysis method employing preprocessing and pre-analysis as disclosed herein, and a diagnostic design computer 12 operatively connected with the non-transitory storage medium to read and execute instructions to perform the log pattern editing method. The illustrative computerized diagnostic assistance device 14 is designated as a field service engineer computer 14 operatively connected with the non-transitory storage medium to read and execute the instructions to perform a diagnostic assistance method employing the log patterns deployed from the log pattern editing device 10, 12. In the foregoing, it will be appreciated that each of the electronic processors 10, 12, 14 may be embodied by a computer, server, desktop computer, notebook computer, or other microprocessor-based electronic processing device. Typically, the log pattern analysis method is performed by an electronic processor with high computational capacity, such as the illustrative server 10, due to the extensive computations involved in these analyses (which still remains relatively extensive even with the improved computational efficiency achieved by way of the preprocessing and pre-analysis as disclosed herein). The non-transitory storage media referred to herein may be variously embodied, e.g. as a hard disk drive, RAID array, or other magnetic storage medium, a solid state drive (SSD) or other electronic storage medium, an optical disk or other optical storage medium, various combinations thereof, and/or so forth. Further, it will be appreciated that the disclosed electronic processors may be variously combined, and/or the various non-transitory storage media may be variously combined, by way of electronic data networks 31 or the like. For example, the log pattern editing device 10 may be implemented as a cloud computing resource comprising an ad hoc combination of a number of server computers.

Moreover, the computer or other electronic processor 12 that performs the log pattern editing method includes suitable user interfacing hardware to enable user interaction to perform the log pattern editing and review of the log pattern analysis results. By way of non-limiting example, the illustrative diagnostic design computer 12 which is programmed to perform the log pattern editing method (including invoking the log pattern analysis method performed by the server computer 10 to analyze the initial and/or edited log pattern) includes user interfacing hardware such as an illustrative display 16 (providing display of analysis results and optionally also including a touch sensitive overlay to serve as a user input device), keyboard 18, mouse, trackball, illustrative trackpad or other pointing device 20, and/or so forth. Likewise, the illustrative field service engineer computer 14 includes user interfacing hardware such as an illustrative display 22 (providing display of analysis results and optionally also including a touch sensitive overlay to serve as a user input device), keyboard 24, mouse, trackball, illustrative trackpad or other pointing device 26, and/or so forth.

The log pattern analysis operates on medical imaging device log data including log events and further including service calls. In illustrative FIG. 1, the log events are stored in a log events database 30, and data on the service calls is stored in a service calls database 32. This reflects a common data entry paradigm in which the log events are generated automatically and logged to the log events database 30 by the medical imaging device, while the service calls data are entered manually or semi-manually by a service engineer or other personnel and stored in the service calls database 32. However, this is merely illustrative, and it is contemplated to employ an integrated database that stores both log events and service call data. By way of non-limiting illustration, a medical imaging device may, for example, be a computed tomography (CT) imaging scanner, a magnetic resonance imaging (MRI) scanner, an image-guided therapy (iGT) device employing a C-arm X-ray or other imaging component, a positron emission tomography (PET) scanner, a gamma camera such as are used for single photon emission computed tomography (SPECT) imaging, hybrid imaging systems (e.g. PET/CT), or so forth.

Each service call has a call time, typically designated as a logged day/time when the customer called in the problem that led to a service call being opened. The call time may be designated variously, e.g. as the time a service call center agent manually entered the call time, or as an automatically generated timestamp for receipt of a customer call, or so forth. Each service call is associated with a subset of log events occurring within a service call time frame of the call time of the service call. The service call time frame is a configuration parameter of the log pattern analysis, and the service call time frame is preferably set to be of sufficient length that the subset of log events contains all log events that credibly could be causal to or correlative with the root problem that led to the service call. On the other hand, if the service call time frame is too long, then the subset of log events associated with the service call can become impractically large. An appropriate value for the service call time frame could be dependent on numerous factors, e.g. the country or region in which the medical imaging system is based and/or customer type (e.g., larger medical facilities may typically spend more time attempting in-house remediation of a problem whereas smaller medical facilities may resort to calling the vendor more quickly) or so forth.

Typically, the service call time frame extends strictly prior to (and usually up to) the call time of the service call, e.g. if the call time is exactly noon on February $20^{th}$ and the length of the service call time frame is 24 hours then the subset of log events associated with the service call are those log events timestamped between noon February $19^{th}$ and noon February $20^{th}$ (the latter again being the call time). This approach assumes that by the time the service call is placed (i.e. the call time) the root cause should be evident from logs timestamped up to the call time. Using a strictly prior time frame also accommodates the common situation in which the medical imaging device may be taken offline upon detection of certain types of problems (and hence no longer be generating log events). However, it is alternatively contemplated for the service call time frame to additionally extend some length after the call time, e.g. with the call time being noon on February $20^{th}$ and the length of the service call time frame being 24 hours, the subset of log events associated with the service call could be those log events timestamped between 2 pm February $19^{th}$ and 2 pm February $20^{th}$ (in this example extending two hours past the call time).

The disclosed preprocessing is diagrammatically indicated in FIG. 1 by a preprocessor 34, e.g. implemented by the server computer 10 programmed to perform preprocessing of the medical imaging device log data including generating normalized log events by removing or replacing content of the log events according to the normalization rules and linking each normalized log event with one or more service calls having associated log events matching the normalized log event. More generally, the preprocessing of the medical imaging device log data includes generating normalized log events by removing or replacing content of the log events and linking each normalized log event with one or more service calls having associated log events matching the normalized log event. In a suitable approach, the normalized content comprises standardized content that replaces data fields or other selected content of medical imaging device log entries that has variability amongst the log entries. In some specific implementations, the normalized content for a certain type of replacement may be null content, e.g. an empty string—such a normalization amounts to removing the content from the log event.

In one approach, a medical imaging device log event is normalized by replacing content of the medical imaging device log event with normalized content as defined by configuration data 36. For example, the configuration data 36 may suitably include normalization rules that define which fields of a log event are to be normalized and the standardized content with which to replace the content of these fields. Since the normalization amounts to replacing or removing information from the log event, two or more (or indeed many) different medical imaging device log events may normalize in this way to the same normalized medical imaging device log event. All medical imaging device log events that normalize to a particular normalized medical imaging device log event are said to "match" that particular normalized medical imaging device log event. Said another way, a medical imaging device log event is said to match a normalized medical imaging device log event if the medical imaging device log event, when normalized by replacing content with normalized content as defined by the configuration data 36, results in said normalized medical imaging device log event.

The goal of log pattern analysis is to assess how well the log pattern under analysis identifies service calls having a certain root cause (or set of root causes, e.g. somehow related). Thus, each normalized log event is linked with one or more service calls having associated log events matching the normalized log event. In one processing approach, log events associated with service calls (i.e. being part of subsets associated with service calls) are normalized while still being linked with their respective service call(s); then, identical (i.e. duplicative) normalized log events are merged to a single normalized log event that is linked to all service calls whose log events were involved in the merger. It will be appreciated that this "de-duplication" process results in the set of normalized log events being substantially smaller than the set of log events from which the set of normalized log events was derived. Furthermore, the normalized log events contain less information and hence can be processed more efficiently.

As diagrammatically indicated in FIG. 1, the preprocessor 34 does not rely upon any log pattern in performing the preprocessing to generate the normalized log events. However, it will be appreciated that the configuration 36 may be chosen to limit the removal or replacement (i.e. normalization) of data of the log events upon which the log pattern under analysis relies. A tradeoff can be made, wherein the data to be normalized is chosen to be sufficient to provide substantial computational efficiency improvement while retaining sufficient data to provide meaningful pre-analysis respective to a log pattern. The configuration data 36 may be stored in various ways depending upon the desired modification flexibility. For example, configuration data that is never expected to be changed may be hard-coded into the executable instructions implementing the log pattern analysis method. Configuration data that is expected to be rarely changed may be stored in a global configuration file that is only editable by certain authorized personnel (e.g. a lead diagnostic designer having responsibility for maintaining the log patterns analysis system). A local configuration file or task-specific configuration file may be used to store configuration data that is expected to be updated frequently, e.g. depending upon factors such as the particular type of log pattern under analysis and/or the particular set of historical log data being employed for the analysis (e.g., historical log data appropriate for a specific anticipated deployment context may be used, for example if the log pattern is being developed to diagnose a problem likely to occur in a pediatrics department then historical log data obtained from pediatrics departments may be used; whereas, if the log pattern is being developed to diagnose a problem likely to occur in a cardiology department then historical log data obtained from cardiology departments may be used; and/or so forth). It is noted that any change to the normalization rules applied by the preprocessor 34 will require the preprocessing using those normalization rules to be repeated, which is computationally relatively expensive.

The disclosed pre-analysis is diagrammatically indicated in FIG. 1 by a pre-analyzer 38, e.g. implemented by the server computer 10 programmed to perform pre-analysis including identifying a test set of normalized log events that match a log pattern 40 which is under analysis and a test set of service calls 42 linked with the test set of normalized log events. Again, as the goal of log pattern analysis is to assess how well the log pattern 40 under analysis identifies service calls having a certain root cause (or set of root causes, e.g. somehow related), the output of the pre-analyzer 38 is the test set of service calls 42 (rather than the intermediate test set of normalized log events that match the log pattern 40).

More particularly, the goal is to generate the test set of service calls 42 which is a superset of all service calls in the database that are hits for the log pattern 40 under analysis. In other words, the test set of service calls 42 should include all service calls that are associated with subsets of log events that match the log pattern 40 under analysis (without missing any hits), but may also include additional service calls that do not match the log pattern 40 under analysis. To accomplish this, the pre-analysis identifies the test set of normalized log events that match the log pattern 40 under analysis using overinclusive matching in which the normalized log events (that is, the normalized content) is matched to corresponding normalized log pattern items using predefined normalized content matching rules.

The test set of service calls 42 serves as input to the main log pattern analyzer 44. Conventionally, the main log pattern analyzer 44 would be the only log pattern analysis, and would retrieve from the event logs database 30 all log events that are associated with all service calls in the service calls database 32. That is, the main analyzer 44 would conventionally process all log events that lie within the service call time frame of any service call contained in the calls database 32. This could be an enormous amount of data to process, making the main analysis computationally inefficient. By contrast, the log pattern analysis method of FIG. 1 leverages the preprocessor 34 and pre-analyzer 38 to reduce the number of relevant calls to the test set of service calls 42, which is greatly reduced compared with the total number of service calls in the database 32; yet, due to the overinclusiveness of the pre-analysis performed by the pre-analyzer 38 it is ensured that this test set of service calls 42 includes every service call for which the log pattern 40 under analysis scores a hit (and additionally includes some other service calls for which the log pattern 40 under analysis will not hit). The main log pattern analysis performed by the main log pattern analyzer 44 is thus made much more efficient by the "pre-filtering" of service calls performed by the preprocessor 34 and pre-analyzer 38, and more efficiently produces the set of service calls 46 that the log pattern 40 under analysis.

The main log pattern analyzer 44 is suitably implemented by the server computer 10 programmed to analyze the test set of service calls 42 to identify the hit service calls 46, where each hit service call belongs to the test set of service calls 42 and for which the log pattern 40 under analysis has a hit. It is noted that the main log pattern analyzer 44 operates on the "original" log events data from the database 30. That is to say, the main log pattern analyzer 44 does not operate on the normalized log events. Thus, there is no ambiguity in whether the log pattern 40 hits, because there is no information lost due to normalization. The effect of the main analyzer 44 is thus to take as input the overinclusive test set of service calls 42 and remove those service calls that do not actually hit the log pattern 40 so as to output the hit service calls 46.

The medical imaging device log data used in the log pattern analysis is historical data, that is, the service calls are all resolved service calls in which a root cause (or root causes) of the problem that triggered the service call have been identified. Thus, the root cause(s) of the service calls in the database 32 are known and stored as data for the service calls. Hence, a root causes identifier 48 is suitably implemented by the server computer 10 programmed to identify one or more root causes determined by the hit service calls 46. Said another way, the identified root cause(s) are the root causes that were entered into the service calls database 32 for the hit service calls 46 (e.g., by a field service engineer or other professional who responded to the service call and resolved the problem with the medical imaging device).

With continuing reference to FIG. 1, the log patterns analysis method implemented by the server computer 10 is, in a typical practical implementation, invoked by a diagnostic designer who operates the diagnostic design computer 12 to input the log pattern 40 using a log pattern editor 50, i.e. a user interface via which the log pattern 40 under analysis can be edited and the log pattern analysis method can be invoked to present a log pattern hits report 52 summarizing the hit service calls 46 for the edited log pattern 40 under analysis. For example, the log pattern report 52 may be displayed on the display 16 of the diagnostic design computer 12.

The summary of the hit service calls 46 may, by way of non-limiting illustrative example, include information on the identified one or more root causes 48, display of the "raw log event data", that is, the log events on which the log pattern 40 hit (optionally with some contextual surrounding log data, e.g. if the log pattern hit was on a set of log events spanning some time interval then the displayed context may include any additional log events that did not contribute to the hit but are timestamped at times between log events that did contribute to the hit, further optionally including context for some lead-in time interval before the first log event contributing to the hit and/or some lead-out time interval after the last log event contributing to the hit), and/or so forth. If the hit service calls 46 yielded a large number of different root causes 48 then the presented information on the identified root causes 48 may comprise a truncated list of the top-N root causes occurring most frequently amongst the hit service calls 46 along with a count of the number of hit service calls identifying each root cause. The displayed information may further include some quantification of the hit service calls 46, such as a count of the hit service calls (that is, the number of service calls on which the log pattern 40 under analysis hits), a ratio of the count of the hit service calls to a count of service calls in the medical imaging device log data, both the count and the ratio, or so forth. The foregoing are merely illustrative report content, and more generally the log pattern report 52 may include additional and/or other information such as the type(s) of medical imaging devices to which the hit service calls 46 pertain, the type(s) of imaging tasks those devices were being used for, and/or so forth.

It will be appreciated that the log pattern editing and analysis process can be repeated iteratively under guidance of the diagnostic designer operating the diagnostic design computer 12 to input the initial log pattern 40 via log pattern editing user interface 50, followed by invocation of the log patterns analysis method implemented by the server computer 10 to generate the log pattern report. After reviewing this report, the diagnostic designer may further edit the log pattern 40 via the log pattern editor 50 and invoke the log patterns analysis method to generate an updated log pattern report for the updated (i.e. further edited) log pattern, and so forth until the diagnostic designer is satisfied that the log pattern is producing optimized (or at least acceptable) diagnostic results, e.g. as quantified by sufficiently strong correlation with one or a few root causes, a manageable number of total hits, a sufficiently low rate of false positives (i.e. hit service calls that do not identify the root cause(s) that the log pattern is intended to diagnose), and/or so forth. In performing this iterative process under guidance of the diagnostic designer, the same normalized log data generated by the preprocessor 34 can be used for each iteration (this is because the preprocessing is not log pattern-specific). Hence, the computationally intensive preprocessing can be performed before the diagnostic designer begins log pattern editing via the log pattern editing user interface 50, and the editing is thus a fast process. More generally, the preprocessing can be done at a certain time t, and, as of time t, all diagnostic designers can start to use the log pattern analysis tool to compose a multitude of patterns in an interactive setting. At a certain time, e.g., after one year, this preprocessing may be redone to update the set of calls considered, e.g., to include more recent calls, and the diagnostic designers may start using the updated data as soon as this preprocessing is finished.

When the diagnostic designer is satisfied with the log pattern, then the user interface presented by the log pattern editing method (e.g. the log pattern editor user interface 50) may suitably provide a "save as" user dialog or the like via which the (final) edited log pattern 40 under analysis can be stored as a deployed log pattern in a deployed log patterns database 54, preferably annotated with one or more root causes determined by the hit service calls 46 in the final analysis run on the final edited log pattern 40. The deployed log pattern is thus designed to be diagnostic for the annotated one or more root causes. In practice, there may be further validation layers interposed between the finally optimized log pattern output by the log pattern editor 50 and actual deployment of that log pattern in the field. For example, the final log pattern may be reviewed by a lead diagnostic designer or otherwise may need to pass some approval process. In daily practice, a remote service engineer may take the output of the log pattern into account in a more detailed assessment of the issue, for example by performing additional tests. For example, more than one log pattern may give hits, providing inconclusive evidence that is then resolved by performing additional tests.

With continuing reference to FIG. 1, the deployed log patterns stored in the database 54 are applied during current service calls performed in the field. The computerized diagnostic assistance device 14 (illustrative field service engineer computer 14) is operatively connected with a non-transitory storage medium (not shown) to read and execute the instructions to perform a diagnostic assistance method (e.g., implemented as an illustrated field-based diagnostic assistance application program 56 running on the computer 14) including: applying a deployed log pattern to medical imaging device log data generated by a medical imaging device-under-service; and, conditional upon the deployed log pattern having at least one match in the medical imaging device log data generated by a medical imaging device-under-service, controlling the display 22 of the field service engineer computer 14 to present the one or more root causes annotated to the deployed log pattern in the database 54. The application program 56 may also present further information, such as displaying the log events that contributed to the log pattern match (again, optionally displayed in context including surrounding log events time-stamped between or leading into and/or out of the log events making up the match).

Figure 2:
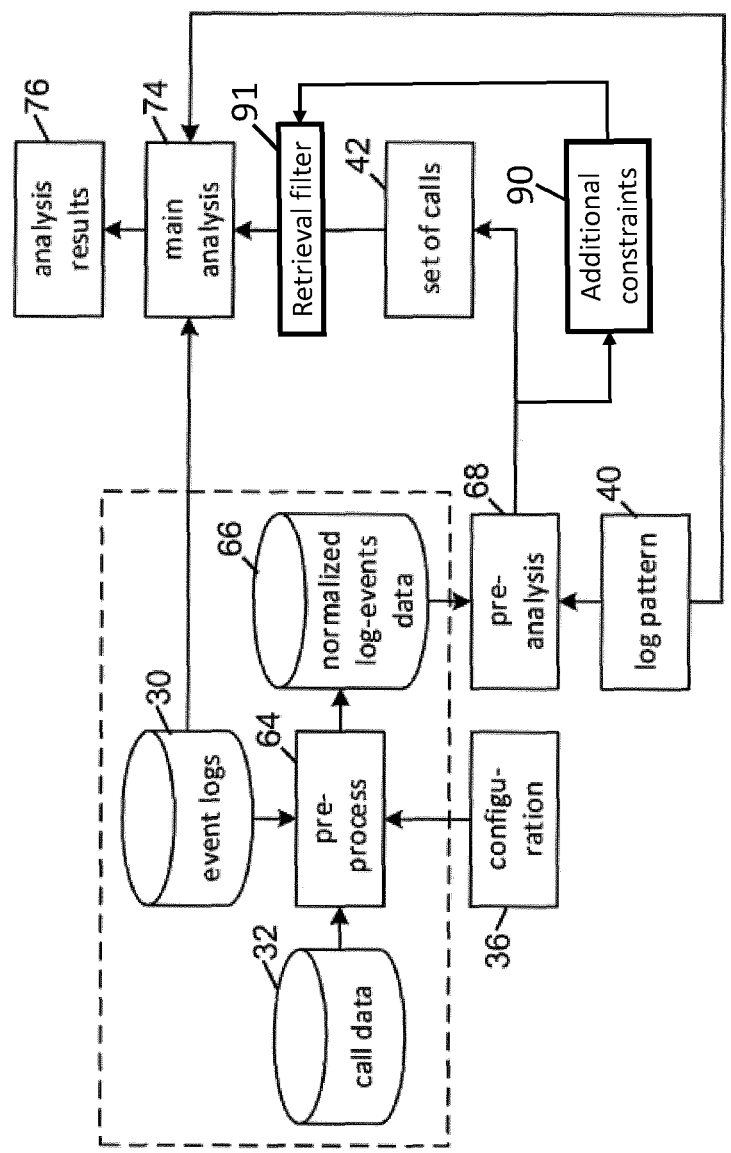
FIG. 2 diagrammatically illustrates an automated log pattern performance analysis method suitably performed by the device of FIG. 1.

With reference now to FIG. 2, an illustrative log analysis method suitably performed by the log pattern analysis device 10 of FIG. 1 is described. The method operates on log events data stored in the events log database 30 and on service calls stored in the service calls database 32. Preprocessing 64 is performed by the preprocessor 34 of FIG. 1 in accord with the configuration data 36 to produce normalized log events data 66. Pre-analysis 68 of the log pattern 40 under analysis is performed by the pre-analyzer 38 of FIG. 1 in order to generate the test set of service calls 42. A main analysis 74 is performed by the main analyzer 44 of FIG. 1 so as to generate analysis results 76, e.g. the hit service calls 46 and root cause(s) 48 identified in the hit service calls 46, and optionally additional result information such as the log events that match the log pattern 40 under analysis optionally with surrounding log events for context.

Based on a given configuration, the preprocessing 64 generates a list of normalized log-events data 66 and, for each normalized log event $\hat{l}$, a list of identifiers for service calls for which an associated log event l normalizes to $\hat{l}$. The normalized log-events data 66 is processed in the pre-analysis 68 that, given the log pattern 40 under analysis, determines the test set of service calls 42. These are next used by the main analysis 74 which, for each service call of the test set of service calls 42, retrieves the subset of log events occurring within the service call time frame of the call time of the service call and analyzes the given log pattern 40, based on this data, to calculate whether the log pattern 40 has a hit for this service call. These form the basis for the results 76 of the main analysis. The normalization step (i.e. preprocessing 64) employs normalization rules of the configuration data 36 to replace dates, times, integers, IP addresses, temperature values, etc., in attributes or fields of a log event, e.g. textual parts like the description and additional info, by constant strings, thus effectively mapping potentially many different log events onto one normalized log event. For example, a decimal integer will be replaced by the string <xxx>. It is contemplated for the normalized content to be simply removed (or, equivalently, to be replaced by the empty string < >). The test set of service calls 42 is typically significantly smaller than the total number of calls for the given configuration. This results in considerable savings in computation and data transport. For example, instead of retrieving, for 10,000 service calls, which may have a week's worth of associated log event data (or more) from a single machine, generating, on average 90,000 log events for analysis, by way of the preprocessing 64 and pre-analysis 68 it may suffice to only do this for some 150 calls.

In the following, some additional aspects and/or embodiments and/or examples are discussed with reference to the illustrative log pattern analysis method of FIG. 2.

In one illustrative example, the configuration 36 includes a time frame of, typically one or more years in the past (although a shorter time frame, e.g. on the order of months or even weeks, is alternatively contemplated), a set of system codes and releases that identify which systems the preprocessing 64 will be done, and the definition of the service call time frame, e.g., one day or one week extending backward in time from the call time of the service call (again, longer or shorter service call time frames are contemplated, and moreover the service call time frame could extend partly forward in time past the call time of the service call).

For the given configuration 36, the preprocessing 64 creates, for each service call in the given time frame involving one of the identified systems, a list of all log events that were generated during the service call time frame by this system. These log events are normalized. Using this data, the list of normalized log events 66 is generated and, for each normalized log event $\hat{l}$, a list of all identifiers for service calls for which a log event l normalizes to $\hat{l}$. This preprocessing 64 only needs to be done once for a given configuration 36, after which the results 66 of this preprocessing 64 can be used repeatedly for many log patterns.

Figure 3:
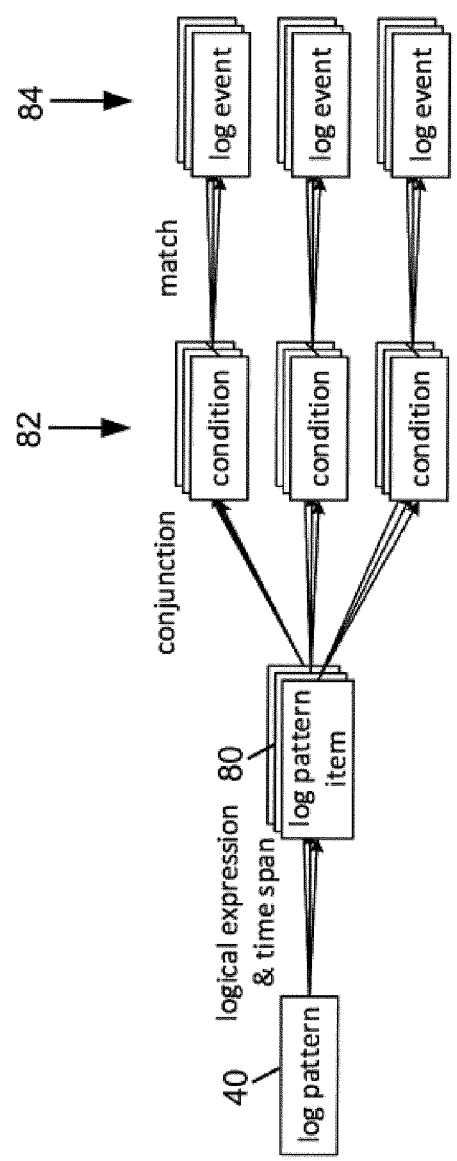
FIG. 3 diagrammatically illustrates a visual representation of decomposition of the structure of a log pattern into log events as described herein.

With continuing reference to FIG. 2 and with further reference to FIG. 3, in one illustrative example, the log pattern 40 comprises a logical expression, consisting of log pattern items 80, and a time span. For example, the logical expression could be $A \wedge B \wedge \neg (C \vee D)$ in a time span of length at most t, where A, B, C, D are log pattern items, "$\wedge$" denotes a logical conjunction, "$\vee$" denotes a logical disjunction, "$\neg$" denotes a logical negation, and t denotes an amount of time. Each log pattern item 80 consists of a combination of conditions 82 on a single log event that, together, identify the set of log events 84 that each satisfy these conditions. This is illustrated visually in FIG. 3. These conditions 82 apply to the various attributes of which the log pattern 40 is composed. Examples are event id, event category, system mode, description, additional info. These conditions can be in terms of exact values, e.g., event id=0630000001 or system mode=normal operation, description=Generator exception occurred, but can also be in terms of regular expressions, e.g., additional info contains the regular expression POST (Clea|Poly-G2) LUC1 Passed. The pre-analysis 68 (see FIG. 2) normalizes the values of the description and additional info part of the conditions in this example. By contrast, the event id and event category are not normalized in this illustrative example. For each of the normalized log pattern items, normalized log events are identified that satisfy the normalized log pattern item, using the normalized log event data. By combining the call identifiers associated to each of these normalized log events, a set of call identifiers are obtained during which the log pattern item occurs. The preprocessing 64 can be applied to log patterns that are normalizeable. Let the normalized version of a log event l be denoted by $\hat{l}$. Normalizeability of a log pattern means that each of its log pattern items that is not involved in a negation in conjunctive normal form (CNF), is normalizeable. Normalizeability of a log pattern item means that, if the log pattern item identifies a set S of log events, and the normalized version of this log pattern item identifies a set S' of normalized log events, then it holds that for all l∈S, we have $\hat{l}$∈S'. In other words, a log pattern is normalizeable whenever the normalized version identifies a superset of its hits.

In general, a log pattern is normalizeable. Consider, the condition description=abc15 in a log pattern item. It identifies all log events that have description=abc15. In one normalization approach, normalization of the condition changes it to description=abc<xxx>. This normalized condition identifies all normalized log events that have description=abc<xxx>, the normalized version of the original description in the log event. Also for most regular expressions, this property holds. For example the regular expression (05AH|06AW) can be normalized to (<xxx>AH|<xxx>AW), so that an original log event containing 05AH will, once normalized, contain <xxx>AH. It will be appreciated that an original log event containing 02AH will also contain <xxx>AH, matching the normalized condition, so that normalization may generate more hits. As an aside, there are a few instances of regular expressions that are not normalizeable. For example, A{5}, which means five As in a row. Depending on the exact normalization procedure, normalization may change this to A{<xxx>}, which is not a valid regular expression, and may generate no match on any normalized log event. This can be detected, so that an exception can be thrown and the evaluation stops.

Now, two things are calculated in this example. First, by using the sets of calls associated to each of the normalized log pattern items in the log pattern, the logical expression of the log pattern can be evaluated, e.g. using Dijkstra's Shunting algorithm, to translate it to reverse Polish notation and performing a stack-based evaluation of this expression in reverse Polish notation. But, while doing this evaluation, each negation operator is evaluated to true, i.e., to all calls considered. The time span is also not taken into account. It can be shown that, in this way, a superset of all service calls is obtained in which the original log pattern has at least one hit. Including the time span in the main analysis 74 is suitably done with a window-based algorithm.

In some embodiments, the normalization of log events entails the replacement of various kinds of numbers, like time, IP addresses, binary, decimal or hexadecimal numbers, etc., by constant strings. This significantly reduces the number of different log events. While this normalization is typically done on textual fields, such as a description or additional info field, it is not performed on fields that have an identifying character, such as an event id or system mode.

A log pattern contains a logical expression in terms of log pattern items, which in turn identify a number of log events in terms of conditions on one or more fields of the log event. Now, for each normalizeable log pattern, the value fields in each log pattern item are normalized, insofar they concern these textual fields like the description or additional info fields of a log event, leading to a normalized log pattern. With the aid of this normalized log pattern, all matching, normalized log events can be searched for in the preprocessed data. From these matching, normalized log events, the identifying fields (such as the event id and event category) are extracted and this information is used to limit the number of log events to be downloaded/retrieved to only those that have matching identifying fields, such as the event id and event category field. In this way, the number of log events to be downloaded and/or retrieved is significantly reduced, thereby saving time and cost, while increasing efficiency.

Referring back to FIGS. 1 and 2, a set of additional constraints 90 is generated, and is used as a retrieval filter 91 to filter retrieval of log events in the time frame(s) of the test set of service calls 42, to the main log pattern analyzer 44. The set of additional constraints 90 acts to reduce the number of relevant log events to be downloaded in order to test the log pattern against the test set of service calls 42. In this manner, the number of downloaded and analyzed log events associated with the hit service calls 46 is reduced, which means that less log data must be downloaded and analyzed.

The log data undergoing analysis comprise log events which are time stamped and which are defined by values for a set of fields. The log data undergoing analysis are stored on the server 30 which is accessible by the at least one electronic processor via an electronic network 31. In one illustrative embodiment, the filter 91 may be implemented as follows. A retrieval query is generated to select log events that are in a time interval (for example, a time period prior to, and optionally extending some time past, the time that a service call of the test set of service calls 42 is placed), and that also satisfy the at least one additional constraint 90 associated with the log pattern items 80 and defined on one or more filter fields of the set of fields of the log data. For example, the additional constraint(s) can be defined on the event ID and event category fields of the log data. More particularly, the (event ID, event category) pair values of all normalized log events of the normalized log events data 66 that match the normalized log pattern item in the pre-analysis 68 are suitably compiled into a table, and the additional constraint 90 is satisfied by any log event whose (event ID, event category) pair value is in the table.

Figure 4:
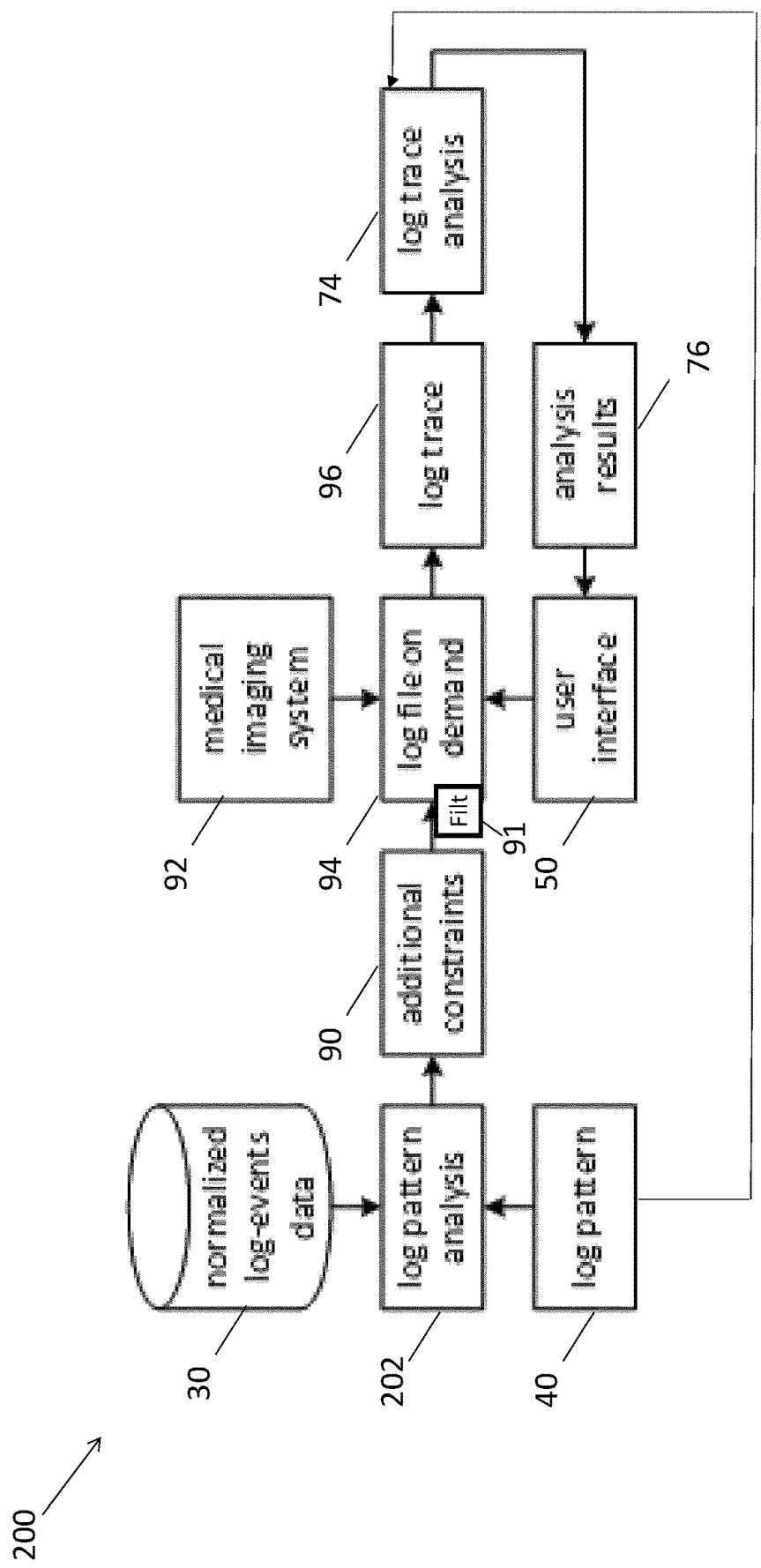
FIG. 4 diagrammatically illustrates use of a deployed log pattern by the field based diagnostic assistance application of FIG. 1 in diagnosing a problem with a specific medical imaging device undergoing diagnosis.

With reference now to FIG. 4, an illustrative log analysis method 200 suitably performed by the field-based diagnostic assistance application 56 of FIG. 1 is described. As previously discussed, the application 56 applies a deployed (e.g. already validated) log pattern to medical imaging device log data generated by a medical imaging device-under-service; and, conditional upon the deployed log pattern having at least one match in the medical imaging device log data generated by a medical imaging device-under-service, controlling the display 22 of the field service engineer computer 14 to present the one or more root causes annotated to the deployed log pattern in the database 54. In the method 200, the additional constraints 90 are generated from normalized log events data 66 stored in the events log database 30. To provide up-to-date constraint(s) 90, these constraint(s) may be generated "on the fly" by performing the pre-analysis 202 on the most up-to-date historical normalized log events dataset. As this normalized dataset is relatively small (e.g., 1 GB), it may be updated occasionally (say, monthly) and pre-loaded onto the service engineer's computer as a monthly update. The validated log pattern 40 that is about to be applied in an effort to diagnose the problem with the medical imaging device is then normalized and the pre-analysis 202 is performed by applying the normalized validated log pattern against the most up-to-date historical normalized log events database 30 to identify the matching normalized log events. Then, one or more unnormalized fields of the normalized log data, e.g. the (event ID, event category) field value pairs in an illustrative example, of these matching normalized log events define the up-to-date additional constraint(s) 90 for the validated log pattern. In the example, the (event ID, event category) pair values of all normalized log events of the normalized log events data 30 that match the normalized log pattern item in the pre-analysis 202 are suitably compiled into a table, and the additional constraint(s) 90 are satisfied by any log event whose (event ID, event category) pair value is in the table. A log file on demand (LOD) process 94 constructs a query to retrieve log data of a medical imaging device or system 92 under service that is timestamped within some specified time interval respective to the time of the service call (e.g., the last 12 hours of log data, in one non-limiting illustrative example, or a time interval input by a user via a user interface 50 in another example) and that satisfies the additional constraint(s) 90, e.g. by having (event ID, event category) pair values that are in the table defining the additional constraints 90. The retrieved log events are referred to as the log trace 96 in FIG. 4. The main analysis 74 is performed by matching the log entries of the log trace 96 with the log pattern 40 (which is not normalized when applied in the main analysis 74) so as to generate analysis results 76, e.g. conditional upon the deployed log pattern 40 having at least one match in the medical imaging device log data generated by the medical imaging device-under-service 92, controlling the display 22 of the field service engineer computer 14 (forming the user interface 50 of FIG. 4 in this example) to present the one or more root causes annotated to the deployed log pattern 40 in the database 54 (see FIG. 1).

Figure 5:
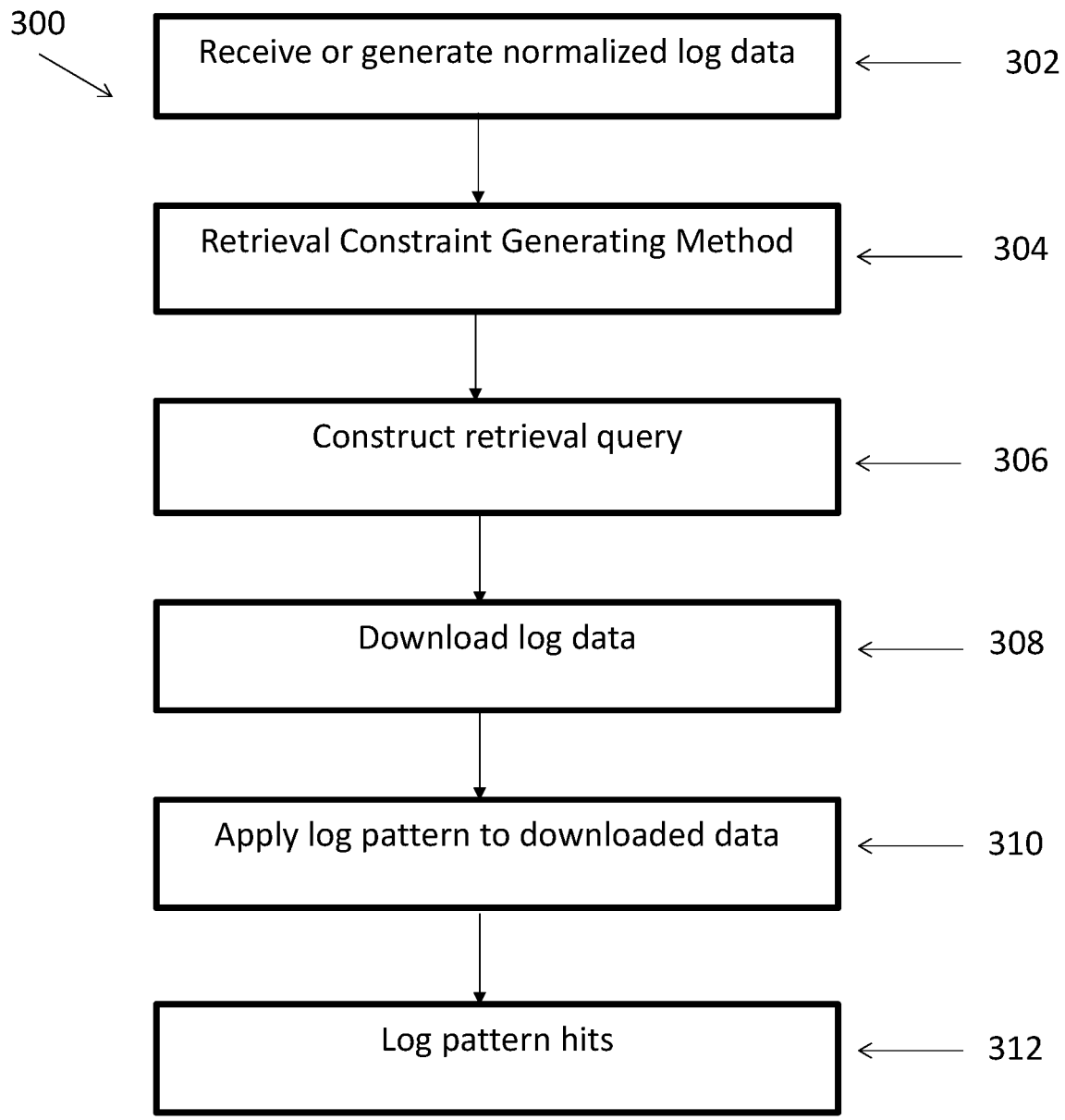
FIG. 5 shows exemplary flow chart operations of the system of FIG. 1.

With reference to FIG. 5, an illustrative embodiment of a log pattern analysis method 300 is diagrammatically shown as a flowchart. The method 300 is performed by applying a log pattern to log data undergoing analysis comprising log events which are time stamped and which are defined by values for a set of fields. The log data undergoing analysis are stored in the log events database 30 server accessible by the server computer 10, the design computer 12, and/or the computerized diagnostic assistance device 14 (collectively, at least one electronic processor) via the electronic network 31.

At 302, the at least one electronic processor is programmed to receive or generate normalized log data. For example, in the testing/validation phase of FIG. 1, the normalized log data is generated by the preprocessor 34 which generates normalized log events from the event logs 30 by removing or replacing content of the log events according to the normalization rules. In the diagnostic phase (FIG. 4), the normalized log events data 30 are suitably received as periodic (e.g. monthly) updates generated off-line by the preprocessor 34 and packaged as an update for incorporation into the field-based diagnostic assistance application 56.

At 304, the at least one electronic processor is programmed to perform a retrieval constraint generation method 400 operating on the normalized log data generated at 302. For example, the additional constraint(s) can be defined on the event ID and event category fields (or other chosen unnormalized fields) of the normalized log data. More particularly, the (event ID, event category) pair values of all normalized log events of the normalized log events data 66 that match the normalized log pattern item are suitably compiled into a table, and the additional constraint is satisfied by any log event whose (event ID, event category) pair value is in the table.

At 306, the at least one electronic processor is programmed to construct a retrieval query to select log events that are in a defined or selected time interval and that also satisfy the at least one additional constraint generated at step 304 which is associated with the log pattern and defined on one or more filter fields of the set of fields. The one or more filter fields may, in a non-limiting example, include a type of log event and an event category. The constructing of the retrieval query includes determining the time interval relative to a time of the service call (e.g., 12 hours leading up to the time of the service call). In another example, the historical log data is the log data undergoing analysis and the constructing of the retrieval query includes determining the time interval as one or more time intervals encompassing the matching normalized log events (e.g., the set of calls 42 of FIG. 1).

At 308, the at least one electronic processor is programmed to apply the query generated at 306 to download a sub-set of the log data for analysis from the server 30 to the at least one electronic processor via the electronic network 31. The sub-set is selected from the log data undergoing analysis by the retrieval query (e.g., the historical log events data 30 during the log pattern testing/validation phase; or the log data of the particular machine under service 92 in the diagnostic phase of FIG. 4).

At 310, the at least one electronic processor is programmed to apply the log pattern to the downloaded sub-set of the log data undergoing analysis to identify log pattern hits 312 in the log data undergoing analysis. The log pattern hits 312 may be variously used, e.g. to generate a log pattern hits report 52 for use in the testing and/or validation as shown in FIG. 1, or to produce analysis results 76 for presentation to a service engineer via the user interface 50 in the diagnostic phase of FIG. 4.

It will be appreciated that the disclosed preprocessing and pre-analysis provides savings in computational effort as well as in transport of data, e.g., over a network. In addition, the preprocessing and pre-analysis facilitates generation of log patterns of higher quality, which is expected to have a positive impact on the maintenance of medical systems, in particular in terms of reduced total cost of ownership and less unplanned downtime.

The disclosure has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A non-transitory computer-readable medium storing instructions readable and executable by at least one electronic processor to perform a log pattern analysis method by applying a log pattern to log data undergoing analysis comprising log events which are time stamped and which are defined by values for a set of fields, wherein the log data undergoing analysis are stored on a server accessible by the at least one electronic processor via an electronic network, the log pattern analysis method comprising:

constructing a retrieval query to select log events that are in a time interval and that also satisfy at least one additional constraint associated with the log pattern and defined on one or more filter fields of the set of fields;

downloading a sub-set of the log data undergoing analysis from the server to the at least one electronic processor via the electronic network, wherein the sub-set is selected from the log data undergoing analysis by the retrieval query;

applying the log pattern to the downloaded sub-set of the log data undergoing analysis to identify log pattern hits in the log data undergoing analysis; and controlling a display screen to display a report of the log pattern hits in the log data undergoing analysis.

2. The non-transitory computer-readable medium of claim 1 storing further instructions readable and executable by at least one electronic processor to perform a retrieval constraint generation method operating on historical log data comprising log events which are time stamped and which are defined by values for the set of fields, the retrieval constraint generation method comprising:

normalizing selected fields of the set of fields in the log pattern to generate at least one normalized log pattern item wherein the selected fields do not include the one or more filter fields;

identifying matching normalized log events that match the at least one normalized log pattern item in normalized log data wherein the normalized log data are generated from the historical log data by normalizing the selected fields in the historical log data; and generating the at least one additional constraint from values of the one or more filter fields in the matching normalized log events.

3. The non-transitory computer-readable medium of claim 2 wherein the log data undergoing analysis is generated by a medical imaging system undergoing diagnosis and the historical log data is different from the log data undergoing analysis.

4. The non-transitory computer-readable medium of claim 3 wherein:

the retrieval constraint generation method further includes storing a data structure containing both the log pattern and the at least one additional constraint, and the log pattern analysis method further includes retrieving the log pattern and the at least one additional constraint from the stored data structure.

5. The non-transitory computer-readable medium of claim 2 wherein the historical log data is the log data undergoing analysis and the constructing of the retrieval query includes:

determining the time interval as one or more time intervals encompassing the matching normalized log events.

6. The non-transitory computer-readable medium of claim 2 wherein the generating of the at least one additional constraint from values of the one or more filter fields in the matching normalized log events includes:

generating the additional constraint that the one or more filter fields match the corresponding filter fields of at least one of the matching normalized log events.

7. The non-transitory computer-readable medium of claim 1 wherein the log data undergoing analysis is generated by a medical imaging system undergoing diagnosis in response to a service call, and the constructing of the retrieval query includes:

determining the time interval relative to a time of the service call.

8. The non-transitory computer-readable medium of claim 1, wherein the one or more filter fields include a type of log event and an event category.

9. The non-transitory computer-readable medium of claim 1, storing further instructions readable and executable by the at least one electronic processor to perform a logging method comprising receiving log data including at least the log data undergoing analysis from one or more medical imaging systems via the electronic network.

10. A log pattern analysis device, comprising:

an electronic processor; and a non-transitory computer-readable medium storing instructions readable and executable by the electronic processor to:

perform a retrieval constraint generation method operating on historical log data comprising log events which are time stamped and which are defined by values for the set of fields, the retrieval constraint generation method comprising:

normalizing selected fields of the set of fields in the log pattern to generate at least one normalized log pattern item wherein the selected fields do not include the one or more filter fields;

identifying matching normalized log events that match the at least one normalized log pattern item in normalized log data wherein the normalized log data are generated from the historical log data by normalizing the selected fields in the historical log data; and generating at least one additional constraint from values of the one or more filter fields in the matching normalized log events; and perform a log pattern analysis method by applying a log pattern to log data undergoing analysis comprising log events which are time stamped and which are defined by values for a set of fields, wherein the log data undergoing analysis are stored on a server accessible by the at least one electronic processor via an electronic network, the log pattern analysis method comprising:

constructing a retrieval query to select log events that are in a time interval and that also satisfy the at least one additional constraint associated with the log pattern and defined on one or more filter fields of the set of fields;

downloading a sub-set of the log data undergoing analysis from the server to the at least one electronic processor via the electronic network, wherein the sub-set is selected from the log data undergoing analysis by the retrieval query;

applying the log pattern to the downloaded sub-set of the log data undergoing analysis to identify log pattern hits in the log data undergoing analysis; and controlling a display screen to display a report of the log pattern hits in the log data undergoing analysis.

11. The log pattern analysis device of claim 10, wherein the log data undergoing analysis is generated by a medical imaging system undergoing diagnosis and the historical log data is different from the log data undergoing analysis.

12. The log pattern analysis device of claim 11, wherein:
the retrieval constraint generation method further includes storing a data structure containing both the log pattern and the at least one additional constraint, and
the log pattern analysis method further includes retrieving the log pattern and the at least one additional constraint from the stored data structure.

13. The log pattern analysis device of claim 10 wherein the log data undergoing analysis is generated by a medical imaging system undergoing diagnosis in response to a service call, and the constructing of the retrieval query includes:
determining the time interval relative to a time of the service call.

14. The log pattern analysis device of claim 10, wherein the historical log data is the log data undergoing analysis and the constructing of the retrieval query includes:
determining the time interval as one or more time intervals encompassing the matching normalized log events.

15. The log pattern analysis device of claim 10, wherein the generating of the at least one additional constraint from values of the one or more filter fields in the matching normalized log events includes:
generating the additional constraint that the one or more filter fields match the corresponding filter fields of at least one of the matching normalized log events.

16. The log pattern analysis device of claim 10, wherein the one or more filter fields include a type of log event and an event category.

17. The log pattern analysis device of claim 10, storing further instructions readable and executable by the at least one electronic processor to perform a logging method comprising receiving log data including at least the log data undergoing analysis from one or more medical imaging systems via the electronic network.

18. A log pattern analysis method, comprising:
retrieving historical log data comprising log events which are time stamped and which are defined by values for the set of fields;
normalizing selected fields of the set of fields in the log pattern to generate at least one normalized log pattern item wherein the selected fields do not include the one or more filter fields;
identifying matching normalized log events that match the at least one normalized log pattern item in normalized log data wherein the normalized log data are generated from the historical log data by normalizing the selected fields in the historical log data;
generating at least one additional constraint from values of the one or more filter fields in the matching normalized log events;
applying a log pattern to log data undergoing analysis comprising log events which are time stamped and which are defined by values for a set of fields,
constructing a retrieval query to select log events that are in a time interval and that also satisfy the at least one additional constraint associated with the log pattern and defined on one or more filter fields of the set of fields;
downloading a sub-set of the log data undergoing analysis from the server to the at least one electronic processor via the electronic network, wherein the sub-set is selected from the log data undergoing analysis by the retrieval query;
applying the log pattern to the downloaded sub-set of the log data undergoing analysis to identify log pattern hits in the log data undergoing analysis; and
controlling a display screen to display a report of the log pattern hits in the log data undergoing analysis.

19. The log pattern analysis method of claim 18, wherein the log data undergoing analysis is generated by the medical imaging system undergoing diagnosis in response to a service call, and the constructing of the retrieval query includes:
determining the time interval relative to a time of the service call.

20. The log pattern analysis method of claim 18, further including:
receiving log data including at least the log data undergoing analysis from one or more medical imaging systems via an electronic network.

\* \* \* \* \*